United States Patent [19]

Collie, III

[11] Patent Number: 5,170,749
[45] Date of Patent: Dec. 15, 1992

[54] ANIMAL FEEDER
[75] Inventor: Wilson F. Collie, III, Comfort, Tex.
[73] Assignee: Sweeney Enterprises, Boerne, Tex.
[21] Appl. No.: 696,242
[22] Filed: May 6, 1991
[51] Int. Cl.$^5$ .............................................. A01K 5/00
[52] U.S. Cl. .................... 119/51.01; 222/561; 222/545
[58] Field of Search .................... 119/51.01, 52.3, 52.4, 119/53, 53.4, 57.91; 222/559, 561, 545; 294/24; 226/23, 262, 256; 198/550.1, 530; 53/570

[56] References Cited
U.S. PATENT DOCUMENTS 3,083,057  3/1963  Kiser et al. ........................... 119/53
3,554,576  2/1968  Parker ................................... 298/24
3,565,044  2/1971  Sorrels ................................. 119/53

Primary Examiner—John G. Weiss
Attorney, Agent, or Firm—Donald R. Comuzzi

[57] ABSTRACT

The present invention is an animal feeder configured to fit in a vehicle such as a small truck so that a single vehicle operator can actuate feed release. The vehicle operator is provided with a lever configuration that controls the opening and closing of a dual door arrangement on the animal feeder. That arrangement is an improvement over prior art systems because it prevents the animal feeder from jamming in an open position which causes a wasteful release of animal feed.

7 Claims, 1 Drawing Sheet

ANIMAL FEEDER

BACKGROUND OF THE INVENTION

This invention pertains generally to an animal feeder. More particularly, it relates to an animal feeder for delivering feed disks or biscuits used in feeding cattle, deer, or the like.

Typical cattle operations use a vehicle specifically designed and adapted to distribute cattle feed. The problem with such feeders is that they are expensive and often difficult to maintain. A small operator running few cattle typically cannot afford to purchase and maintain that equipment.

An alternative is to drive a truck filled with feed buckets around the ranch and have a person or persons in the back throw the feed out using scoops or some other means. That method is extremely time consuming and often dangerous for the persons in the bed of the truck.

Therefore, systems attempting to overcome the above problems have been designed which are configured to fit in the bed of a small truck and can be actuated by a vehicle operator while driving. Those systems comprise a feed box which uses a gravity feed to deliver the feed disks or biscuits to an opening in the box covered by a single door. To facilitate feed release, the vehicle operator works a mechanism which opens the single door and allows the feed to be released until that mechanism is released and the door is allowed to close. Although those systems overcome many of the above problems, they have a serious operational flaw. Many times after the single door is released to cover the opening and stop feed release, it is jammed open by a feed disk or biscuit. When that occurs, the feed continues to be released until all the feed is gone from the feed box or the vehicle operator stops and manually unjams the door so that it fully closes. The present single door system can be extremely wasteful of feed and can be time consuming if the vehicle operator must continually stop to check and unjam the door.

SUMMARY OF THE INVENTION

The present invention comprises a feed box having an opening in its lower portion configured so that it may be placed in a vehicle such as a small truck. The present invention presents an improvement over conventional animal feeders by its use of an inner and outer door arrangement to close the opening in the feed box and prevent unwanted release of the feed disk or biscuits. Both doors are attached to a handle mechanism which acts as a lever when pulled. The handle is attached to a rope which is strung to the vehicle operator so that the operator may pull the rope which turns the handle and thereby opens both the inner and outer doors. When the handle is pulled, the outer door is first raised up to the level of the inner door, and then both doors are raised simultaneously exposing the opening in the feed box and allowing feed release. When the handle is released, the doors close in the exact opposite order. The inner door is closed first to completely cover the opening followed by the outer door.

The inner door is closed first to seal off the opening and stop the flow of the feed followed by the outer door. However, in the event the inner door is jammed causing a small amount of feed to be released through the opening, the outer door will prevent that feed from being lost. The outer door is positioned at the end of a ramp positioned inside of the feed box such that it cannot be jammed and will stop all feed release.

It is an object of the present invention to provide an animal feeder that prevents the wasteful release of animal feed through the use of a dual door configuration.

It is a further object of the present invention to provide an animal feeder configured to fit in a vehicle such as a small truck and controlled by a single vehicle operator to deliver the required amount of animal feed.

It is yet another object of the present invention to provide an animal feeder that is inexpensive and requires little maintenance.

Other objects of the present invention will become apparent from the following detailed description of a preferred embodiment.

DETAILED DESCRIPTION OF THE PREFERRED EMBODIMENT

Figure 1:
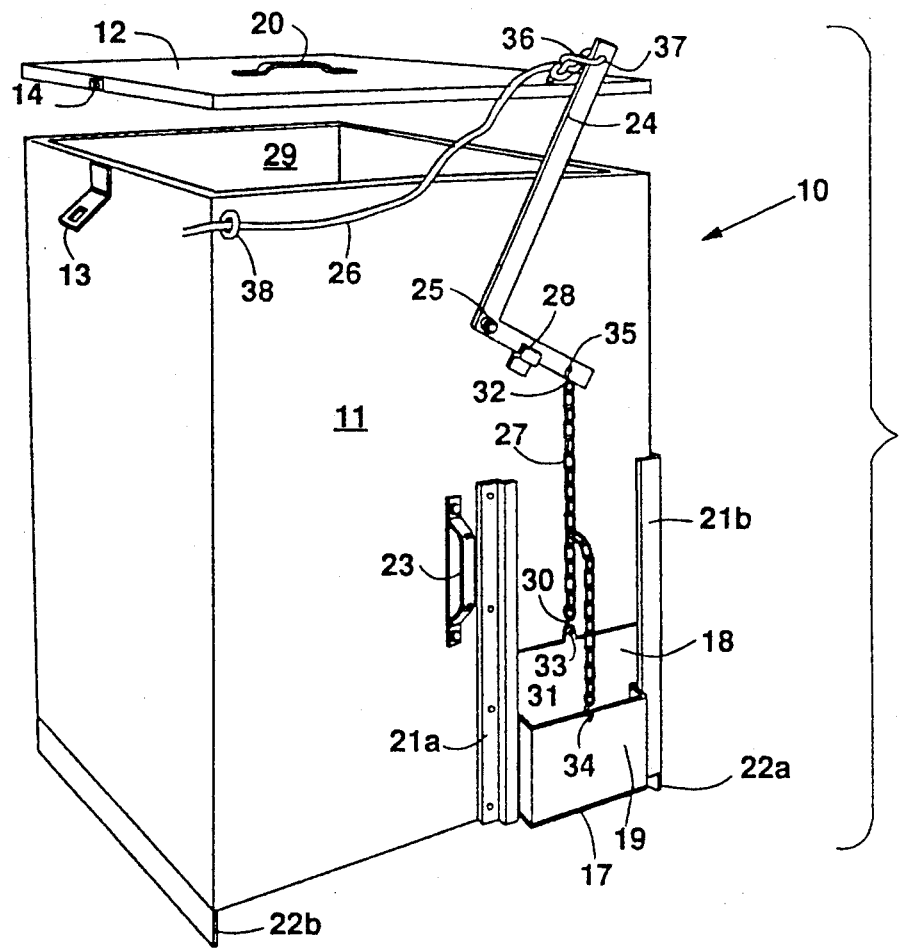
FIG. 1 is a perspective view of the animal feeder.

Referring to FIG. 1, animal feeder 10 is shown. Animal feeder 10 comprises feed box 11 which is supplied with lid 12 used to cover feed input opening 29 in feed box 11 to prevent loss of animal feed after feed box 11 has been filled. Lid 12 is secured to feed box 11 by small chain (not shown) and held down on top of feed box 11 by latch 13 and latch receiver 14. Lid 12 is provided with handle 20 to facilitate easy removal of placement of lid 12 on feed box 11. Feed box 11 is provided with leg 22A and 22B so that it may be positioned in a vehicle having a slightly uneven surface. Feed box 11 is also provided with handle 23 and a second handle on the opposite side (not shown) to allow the animal feeder to be easily carried.

Figure 2:
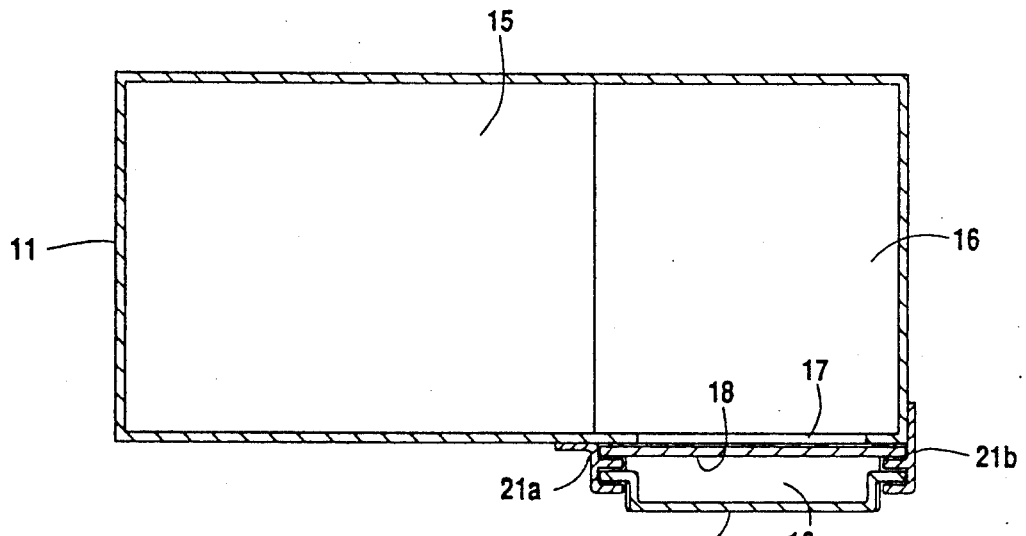
FIG. 2 is a cross-sectional top view of the animal feeder.

Feed box 11 is further provided with opening 17 in one of its lower corners to allow feed release. Referring to FIG. 2, the inside of feed box 11 is provided with a first ramp 15 running parallel to and sloping down towards opening 17 and extending to second ramp 16. Ramp 16 extends from the back wall of feed box 11 through opening 17 to provide ramp lip 16A beyond opening 17. Ramps 15 and 16 are configured to provide a gravity feed of animal feed out opening 17.

The flow of animal feed out of opening 17 is controlled by inner door 18 and outer door 19. Inner door 18 and outer door 19 are slidably connected to feed box 11 by tracks 21A and 21B. Again referring to FIG. 2, tracks 21A and 21B extend slightly beyond the ends of both inner door 18 and outer door 19 to allow both doors to move up and down while remaining in close proximity to feed box 11. In the closed position, the bottom of inner door 18 rests squarely on ramp 16 so that no animal feed will escape. The bottom of outer door 19 extends slightly beyond ramp lip 16A. Outer door 19 is positioned so that in the event inner door 19 is jammed open it can still close about ramp lip 16A and stop any animal feed escaping from underneath inner door 18 from being lost.

The raising and lowering of inner door 18 and outer door 19 is controlled through handle 24. Handle 24 is mounted to feed box 11 as shown through a conventional nut and bolt configuration denoted by numeral 25. In the preferred embodiment, handle 24 is attached to inner door 18 and outer door 19 through chain 27 and s-hooks 30, 31 and 32 wherein the s-hooks 30, 31 and 32 are fitted into holes 33, 34 and 35, respectively. However, one skilled in the art will recognize that any method of securing handle 24 to inner door 18 and outer door 19 could be used.

Handle 24 is controllably connected to pull rope 26 by s-hook 36 centered in hole 37. Pull rope 26 is stabilized against feed box 11 by eye-hook 38 and runs to a vehicle operator. When the vehicle operator pulls on pull rope 26 handle 24 rotates in a counter-clockwise direction which causes tension on chain 27. That tension first causes outer door 19 to be raised up so that its top is at the same level as the top of inner door 18. Once that occurs, the final rotation of handle 24 causes both doors to come up simultaneously thereby, exposing opening 17 and allowing the animal feed to escape. When the vehicle operator releases the pull rope, handle 24 begins rotating in a clockwise direction back to its original position because of the combined weight of inner door 18 and outer door 19. As handle 24 rotates back to its original position, inner door 18 closes first followed by outer door 19. Handle 24 is stopped from rotating beyond the complete closed position of inner door 18 and outer door 19 by handle stop 28. Inner door 18 and outer door 19 are now in their fully closed positions, and no animal feed can escape until the next time the vehicle operator wishes to deliver feed.

For the purposes of disclosure, animal feeder 10 is constructed of sheet metal, and the various pieces that comprise it are connected by pop rivets. However, one skilled in the art will readily recognize that any malleable material of sufficient strength, and any method (e.g. spot welding) could be used in constructing the animal feeder of the present invention.

The foregoing description of a preferred embodiment of the present invention has been prevented for purposes of illustration and description. It is not intended to be exhaustive or to limit the invention to the precise form disclosed, and obviously, many modifications and variations are possible in light of the above teachings. The embodiment was chosen and described in order to best explain the principles of the invention and is practical application to thereby enable others skilled in the art to best utilize the invention in various embodiments and with various modifications which are suited to the particular use contemplated. It is intended that the scope of the invention be defined by the claims appended hereto.

I claim:
1. An animal feeder comprising:
   means for holding animal feed wherein said feed holding means has an opening to release animal feed;
   a first door for closing said opening,
   a second door positioned adjacent said first door for closing said opening if said first door fails to fully close said opening and means for raising and lowering said first and second doors to provide a controlled release of said animal feed.
2. The animal feeder of claim 1 wherein said feed holding means comprises a feed box having a ramp means for delivering said animal feed to said opening and a lid means to prevent feed loss.
3. The animal feeder of claim 2 wherein said first door is slidably connected to said feed box between said opening and said second door.
4. The animal feeder of claim 3 wherein said second door is slidably connected to said feed box outside said first door.
5. The animal feeder of claim 4 wherein said raising and lowering means is a handle connected to said first and second doors, wherein when said handle is pulled, said first and second doors are raised.
6. The animal feeder of claim 5 wherein said feed box is configured to fit in a vehicle.
7. The animal feeder of claim 6 wherein said handle is connected to a rope means that allows said first and second doors to be opened and closed by an operator of said vehicle.

* * * * *